(12) United States Patent
Symreng et al.

(10) Patent No.: US 12,448,349 B2
(45) Date of Patent: Oct. 21, 2025

(54) PROCESS FOR THE PRODUCTION OF UREA FORMALDEHYDE CONCENTRATE

(71) Applicant: Haldor Topsøe A/S, Kgs. Lyngby (DK)

(72) Inventors: Marcus Symreng, Malmö (SE); Pat A. Han, Smørum (DK); Christian Henrik Speth, Lynge (DK)

(73) Assignee: Topsoe A/S, Kgs. Lyngby (DK)

( * ) Notice: Subject to any disclaimer, the term of this patent is extended or adjusted under 35 U.S.C. 154(b) by 813 days.

(21) Appl. No.: 17/420,028

(22) PCT Filed: Mar. 5, 2020

(86) PCT No.: PCT/EP2020/055865
§ 371 (c)(1),
(2) Date: Jun. 30, 2021

(87) PCT Pub. No.: WO2020/187585
PCT Pub. Date: Sep. 24, 2020

(65) Prior Publication Data
US 2022/0048854 A1    Feb. 17, 2022

(30) Foreign Application Priority Data
Mar. 15, 2019  (DK) .......................... PA 2019 00322

(51) Int. Cl.
| | |
|---|---|
| *C07C 273/10* | (2006.01) |
| *C01B 3/02* | (2006.01) |
| *C01B 3/38* | (2006.01) |
| *C01C 1/04* | (2006.01) |
| *C07C 29/151* | (2006.01) |
| *C07C 45/38* | (2006.01) |

(52) U.S. Cl.
CPC ............ *C07C 273/10* (2013.01); *C01B 3/025* (2013.01); *C01B 3/382* (2013.01); *C01C 1/0488* (2013.01); *C07C 29/1518* (2013.01); *C07C 45/38* (2013.01); *C01B 2203/0244* (2013.01); *C01B 2203/0288* (2013.01); *C01B 2203/0415* (2013.01); *C01B 2203/0445* (2013.01); *C01B 2203/0475* (2013.01); *C01B 2203/061* (2013.01); *C01B 2203/068* (2013.01); *C01B 2203/1241* (2013.01); *C01B 2203/1247* (2013.01); *C01B 2203/142* (2013.01)

(58) Field of Classification Search
None
See application file for complete search history.

(56) References Cited

U.S. PATENT DOCUMENTS

| | | | | |
|---|---|---|---|---|
| 5,211,880 A | * | 5/1993 | Primdahl ................ | B01B 1/005 252/376 |
| 2007/0299144 A1 | | 12/2007 | Davey et al. | |
| 2019/0031604 A1 | | 1/2019 | Erlandsson et al. | |

FOREIGN PATENT DOCUMENTS

| | | | | |
|---|---|---|---|---|
| EP | 1 230 203 B1 | 2/2004 | | |
| GB | 2 231 040 A | 11/1990 | | |
| WO | WO-2017103564 A1 | * | 6/2017 | ............... C01B 3/50 |
| WO | WO-2018078318 A1 | * | 5/2018 | ............... C01B 3/02 |
| WO | WO 2018/166873 A1 | 9/2018 | | |

* cited by examiner

*Primary Examiner* — Amy C Bonaparte
(74) *Attorney, Agent, or Firm* — Blank Rome LLP

(57) ABSTRACT

Parallel co-production process for the production of methanol and urea product from a hydrocarbon containing feedstock by means of autothermal reforming, intermediary methanol and ammonia formation and conversion of the ammonia to urea product and catalytic oxidation of the methanol to formaldehyde.

4 Claims, No Drawings

PROCESS FOR THE PRODUCTION OF UREA FORMALDEHYDE CONCENTRATE

The present invention relates to a process for the production of urea formaldehyde concentrate from a hydrocarbon feed feedstock.

More particularly the invention is concerned with a parallel co-production process for the production of methanol and urea product from a hydrocarbon containing feedstock by means of autothermal reforming, intermediary methanol and ammonia formation and conversion of the ammonia to urea product and catalytic oxidation of methanol to formaldehyde.

Production of urea by conversion of ammonia and carbon dioxide is a well-known process and conventionally employed in the industry.

It is the general object of the invention to provide a cost effective, simple and robust process for the production of urea formaldehyde concentrate in a unit that requires a minimum of equipment and unit operations.

Accordingly, the invention provides a process for the production of urea formaldehyde concentrate from a hydrocarbon feedstock comprising steps of:
(a) producing a synthesis gas containing hydrogen, carbon monoxide and carbon dioxide by partial combustion and steam reforming the hydrocarbon feedstock in an autothermal reforming stage;
(b) splitting the synthesis gas from step into a first synthesis gas and a second synthesis gas;
(c) subjecting the second synthesis gas from step (b) in series to a high temperature water gas shift and a medium temperature water gas shift conversion;
(d) removing at least part of the carbon dioxide from the second synthesis gas from step (c) to obtain a carbon dioxide depleted second synthesis gas;
(e) adding nitrogen into the carbon dioxide depleted second synthesis in an amount to obtain a molar ratio hydrogen to nitrogen of 2.8 to 3.2 and removing inerts and carbon monoxide.
(f) catalytically converting the nitrogen and hydrogen in the purified second synthesis gas from step (e) in an inert free ammonia synthesis stage and withdrawing an effluent containing ammonia; and
(g) passing at least part of the ammonia containing effluent to an urea synthesis stage and converting the ammonia in the effluent to urea product by reaction with at least part of the carbon dioxide being removed from the synthesis gas in step (d),
(h) catalytically converting the carbon monoxide, carbon dioxide and hydrogen of the first synthesis gas from step (c) in a once through methanol synthesis stage and withdrawing an effluent containing raw methanol and an effluent containing unconverted first synthesis gas;
(i) recycling the effluent containing the unconverted first synthesis gas to the medium temperature shift conversion in step (c) and/or as fuel to a fired heater and/or to step (e);
(j) subjecting the effluent containing raw methanol to distillation and withdrawing purified methanol from the distillation;
(k) oxidizing at least a part of the purified methanol from step (J) to formaldehyde;
(l) absorbing the formaldehyde from step (k) in water and in an aqueous urea solution prepared from the urea product in step (g) to obtain the urea formaldehyde concentrate.

As further used herein the term "autothermal reforming" means reforming being conducted in an autothermal reformer ATR) with oxygen as oxidant.

Suitable hydrocarbon feed stocks for use in the invention include methane, natural gas, LPG, naphtha and higher hydrocarbons.

Preferably, the hydrocarbon feedstock comprises methane, for instance in the form of natural gas, liquefied natural gas (LNG) or substitute natural gas (SNG).

When employing naphtha and feed stocks with higher hydrocarbons, it is preferred to subject these feed stocks to a prereforming step prior to autothermal reforming stage.

However, prereforming can be employed for all types of hydrocarbon feed stock.

An advantage of using ATR instead of primary and air blown secondary reforming is that the gas flow in downstream equipment is considerably reduced. Thus, the synthesis gas from the ATR comprises carbon monoxide, carbon dioxide, methane, hydrogen, and no nitrogen. The required amount of nitrogen for the ammonia synthesis is in the process according to the invention added to the second synthesis gas downstream the shift reactions and carbon dioxide removal stage in an amount corresponding to the stoichiometric required amount. In practice, the amount of nitrogen required for an optimal ammonia synthesis corresponds to a molar ratio hydrogen to nitrogen of between 2.8 and 3.2.

Preferably, nitrogen is added to the second synthesis gas by means of a nitrogen wash in a nitrogen wash unit (NWU).

As further an advantage, the nitrogen wash removes inerts, residual amounts of hydrocarbons, carbon dioxide and carbon monoxide from the ammonia synthesis gas. These compounds can be utilized as fuel in a fired process- or steam super-heater.

The fired heater is part of the preheating system of the hydrocarbon feed stock.

It would be understood that the term "inerts" as used herein refers to compounds that do not undergo chemical reactions in the ammonia synthesis.

Final control of the carbon monoxide/carbon dioxide ratio to meet the required amount of hydrogen for the ammonia synthesis together with required amount of carbon dioxide necessary for the conversion of ammonia to urea, is obtained by subjecting the second synthesis gas to the high temperature and medium temperature water gas shift reaction prior to the removal of carbon dioxide in step (d).

Removal of carbon dioxide from the second synthesis gas may be performed by any conventional means in a physical or chemical wash as known in the art.

Preferably, carbon dioxide removal is performed by the OASE process available from BASF, which allows easy recovery of absorbed carbon dioxide for use in the urea synthesis.

The methanol synthesis stage is preferably conducted by passing the synthesis gas at moderate pressure, such as 30-60 bar and temperatures 150-300° C. through at least one once-through methanol reactor containing at least one, but preferably two fixed beds of methanol catalyst. A particularly preferred methanol reactor is a fixed bed reactor cooled by a suitable cooling agent such as boiling water, e.g. boiling water reactor (BWR).

In step (h) the methanol rich effluent is preferably a liquid effluent of raw methanol. This effluent is obtained by cooling and condensation of the effluent gas from the methanol reactor(s).

Accordingly the process of the invention may further comprise cooling the synthesis gas withdrawn from each methanol reactor to condense methanol and passing the gas through a separator, withdrawing a bottom fraction from the separator containing the raw methanol, withdrawing an effluent gas containing un-converted synthesis gas which is either passed to a fired heater as fuel and/or the medium temperature shift conversion for boosting the hydrogen concentration in the shifted second synthesis gas.

Preferably, the effluent gas is added to the NWU, where the hydrogen contained in the overhead fraction is utilized while carbon oxides and inert compounds are washed out.

The effluent gas can be passed to the NWU with the aid of an ejector, where the main flow of the carbon dioxide depleted gas acts as a motive flow and the effluent the suction flow.

Alternatively, the effluent can be cycled to the medium temperature shift reaction via an ejector or booster compressor/blower which increases the effluent pressure to fit the main process gas flow.

It would be understood that the term "methanol reactor" as used herein encompasses adiabatic fixed bed reactors and cooled reactors such as boiling water reactors and reactors of the condensing-methanol type which comprises within a common shell a fixed bed of methanol catalyst particles and cooling means adapted to indirectly cooling the methanol synthesis gas with a cooling agent.

In step (f) the second synthesis gas from the correct proportion of hydrogen and nitrogen ($H_2:N_2$ molar ratio of 2.8 to 3.2 is passed through a compressor to obtain the required ammonia synthesis pressure, such as 120 to 250 bar, preferably about 190 bar. Ammonia is then produced in an ammonia synthesis loop comprising at least one ammonia converter. Ammonia may be recovered from the effluent containing ammonia as liquid ammonia by condensation and subsequent separation.

In order to improve the efficiency of the process an off-gas stream containing hydrogen, nitrogen and ammonia from step (f) is sent to the synthesis gas compressor in step (f).

The ammonia being withdrawn from the ammonia synthesis is then converted to the urea product by reaction with carbon dioxide recovered from step (d) as described above.

To produce the formaldehyde employed in the preparation of the urea formaldehyde concentrate, at least a part of the purified methanol withdrawn from the distillation in step (J) is sent to a formaldehyde unit in step (l), where the methanol is either preheated and quenched into preheated air, or evaporated and mixed with the preheated air, before it is oxidized over an oxidation catalyst to formaldehyde.

The formaldehyde produced in the methanol oxidation step (j) is subsequently passed into a formaldehyde absorber. In the formaldehyde absorber, the gaseous formaldehyde effluent from the oxidation step is absorbed in water and an aqueous urea suspension to form a Urea Formaldehyde Concentrate.

A major part of the effluent gas leaving the absorber top is sent back to the preheated air in (k), while the rest is preheated and catalytically incinerated in an incinerator reactor before it is purged to avoid build-up of inerts.

The invention claimed is:

1. A process for the production of a urea formaldehyde concentrate from a hydrocarbon feedstock, the process comprising:
    (a) producing a synthesis gas containing hydrogen, carbon monoxide, and carbon dioxide and not containing nitrogen by partial combustion and steam reforming the hydrocarbon feedstock in an autothermal reforming stage with oxygen as an oxidant, wherein a steam to carbon ratio is between 0.4:1.0 and 1.0:1.0;
    (b) splitting the synthesis gas from step (a) into a first synthesis gas and a second synthesis gas;
    (c) subjecting the second synthesis gas from step (b) in series to a high temperature water gas shift and a medium temperature water gas shift conversion;
    (d) removing at least part of the carbon dioxide from the second synthesis gas from step (c) to obtain a carbon dioxide depleted second synthesis gas;
    (e) adding nitrogen into the carbon dioxide depleted second synthesis gas in an amount to obtain a molar ratio of hydrogen to nitrogen of from 2.8:1.0 to 3.2:1.0 to obtain a purified second synthesis gas;
    (f) catalytically converting the nitrogen and hydrogen in the purified second synthesis gas from step (e) in an inert free ammonia synthesis stage and withdrawing an effluent containing ammonia;
    (g) passing at least part of the effluent containing ammonia to a urea synthesis stage, converting the ammonia in the effluent to a urea product by reaction with at least part of the carbon dioxide being removed from the synthesis gas in step (d), and preparing an aqueous urea solution from the urea product;
    (h) catalytically converting the carbon monoxide, carbon dioxide, and hydrogen of the first synthesis gas from step (b) in a once through methanol synthesis stage and withdrawing an effluent containing raw methanol and an effluent containing unconverted first synthesis gas;
    (i) recycling the effluent containing the unconverted first synthesis gas to the medium temperature water gas shift conversion in step (c);
    (j) subjecting the effluent containing raw methanol to distillation and withdrawing purified methanol from the distillation;
    (k) oxidizing at least a part of the purified methanol from step (j) to formaldehyde; and
    (l) absorbing the formaldehyde from step (k) in water and the aqueous urea solution prepared from the urea product in step (g) to obtain the urea formaldehyde concentrate.

2. The process according to claim 1, wherein the nitrogen is added into the carbon dioxide depleted second synthesis gas in step (e) by means of a nitrogen wash.

3. The process according to claim 1, wherein the effluent containing the unconverted first synthesis gas is recycled by means of an ejector.

4. The process according to claim 1, wherein the methanol synthesis stage in step (h) is performed in at least one methanol reactor containing one or two fixed beds comprising a methanol catalyst.

* * * * *